United States Patent
Pape et al.

(10) Patent No.: US 7,540,259 B2
(45) Date of Patent: Jun. 2, 2009

(54) ELEVATED SLEEPING BED FOR PETS

(75) Inventors: Paulette Pape, East Windsor, NJ (US); Juliann Krauss, Boonton Township, NJ (US)

(73) Assignee: The Coleman Company, Inc., Wichita, KS (US)

( * ) Notice: Subject to any disclaimer, the term of this patent is extended or adjusted under 35 U.S.C. 154(b) by 322 days.

(21) Appl. No.: 11/373,906

(22) Filed: Mar. 13, 2006

(65) Prior Publication Data

US 2006/0219181 A1    Oct. 5, 2006

Related U.S. Application Data

(60) Provisional application No. 60/666,012, filed on Mar. 29, 2005.

(51) Int. Cl.
*A01K 29/00* (2006.01)
*A47C 4/40* (2006.01)

(52) U.S. Cl. ..................... 119/28.5; 297/16.1

(58) Field of Classification Search ............... 119/28.5, 119/485; 248/436; 108/118; 135/145, 146, 135/120, 127; 297/16.2, 42, 16.1, 45
See application file for complete search history.

(56) References Cited

U.S. PATENT DOCUMENTS

| | | | | |
|---|---|---|---|---|
| 244,215 | A * | 7/1881 | Fenby | 108/118 |
| 1,338,124 | A * | 4/1920 | Dale | 108/118 |
| 2,691,410 | A * | 10/1954 | Boucher | 297/45 |
| 2,702,586 | A | 2/1955 | Borgfeldt | |
| 3,124,387 | A | 3/1964 | Maclaren | |
| 3,136,272 | A | 6/1964 | Sprigman | |
| 3,636,520 | A | 1/1972 | Roher et al. | |
| 3,838,883 | A * | 10/1974 | Machen | 297/16.2 |
| 4,192,480 | A * | 3/1980 | Schmidt | 248/436 |
| 4,583,778 | A * | 4/1986 | Liebhold | 297/56 |
| 5,072,694 | A * | 12/1991 | Haynes et al. | 119/482 |
| 5,320,404 | A * | 6/1994 | Le Gal | 297/16.2 |
| 5,570,928 | A | 11/1996 | Staunton et al. | |
| D396,569 | S * | 8/1998 | Chen | D6/368 |
| 5,984,406 | A | 11/1999 | Lee | |
| 6,044,794 | A * | 4/2000 | Raitanen et al. | 119/28.5 |
| 6,135,557 | A * | 10/2000 | Gustafsson | 297/344.18 |
| 6,237,993 | B1 * | 5/2001 | Zheng | 297/16.2 |
| 6,349,962 | B1 * | 2/2002 | Johanson | 280/651 |
| 6,435,133 | B1 * | 8/2002 | Wayne, Jr. | 119/28.5 |
| 6,454,348 | B1 * | 9/2002 | Wu | 297/16.2 |
| 6,591,778 | B1 * | 7/2003 | Alderman | 119/28.5 |
| 6,682,135 | B2 * | 1/2004 | Zheng | 297/16.2 |
| D487,823 | S * | 3/2004 | Wang | D30/118 |
| 6,755,462 | B2 * | 6/2004 | Zheng | 297/16.2 |
| 6,871,905 | B2 * | 3/2005 | Grace | 297/16.2 |
| 6,925,664 | B1 * | 8/2005 | Twigg | 5/113 |
| 6,929,230 | B2 * | 8/2005 | Tsai | 248/436 |

(Continued)

*Primary Examiner*—Yvonne R. Abbott
(74) *Attorney, Agent, or Firm*—Kelly S. Elsea

(57) ABSTRACT

A pet bed (10) that is foldable to a compact configuration when not in use. When it is desired to use the pet bed (10), the pet bed is folded to an extended configuration in which a sleeping surface (14) is extended horizontally and a frame (12) spaces the sleeping surface from the floor. The frame (12) for the pet bed (10) includes one or more stops (40) to prevent collapsing of the frame when the pet bed is in the extended configuration. The stops (40) release as the pet bed is folded back into the storage configuration.

20 Claims, 2 Drawing Sheets

U.S. PATENT DOCUMENTS

| | | | |
|---|---|---|---|
| 7,100,221 B1 * | 9/2006 | Twigg | 5/113 |
| 7,229,128 B2 * | 6/2007 | Lee | 297/16.2 |
| 7,229,131 B2 * | 6/2007 | Chen | 297/217.4 |
| 7,272,865 B2 * | 9/2007 | Le Gette et al. | 5/129 |
| 7,367,617 B1 * | 5/2008 | Bond et al. | 297/16.2 |
| 2003/0127885 A1 * | 7/2003 | Tang | 297/16.2 |
| 2003/0234561 A1 * | 12/2003 | Zheng | 297/45 |
| 2004/0046428 A1 * | 3/2004 | Hwang | 297/188.2 |
| 2005/0199162 A1 * | 9/2005 | Hendricks et al. | 108/118 |

* cited by examiner

ELEVATED SLEEPING BED FOR PETS

REFERENCE TO RELATED APPLICATIONS

This application claims priority to U.S. provisional patent application Ser. No. 60/666,012, filed Mar. 29, 2005, and incorporated herein by reference.

TECHNICAL FIELD OF THE INVENTION

The present invention relates to sleeping and lounging implements, and more particularly to an elevated pet bed.

BACKGROUND OF THE INVENTION

Pets, especially dogs and cats, are very popular. Many pet owners allow their dogs and/or cats to live in the house with them, and will often dedicate a chair or portion of a couch to the pet. However, dedicating furniture in such a manner is often not desired because of the resulting damage to, or soiling of, the furniture.

Often, as an alternative to dedicating some portion of a pet owner's furniture to a pet, the owner may purchase a pet bed or pet pillow and place it on the ground or on furniture to give a comfortable resting place for the pet, and to prevent the pet from contacting the furniture. Although such items work well for their intended purpose, existing pet beds are bulky, and often storing the such a large item can be difficult. Thus, an owner may have to live around the pet bed or pillow, or dedicate a significant amount of storage space during periods when it is not being used.

SUMMARY OF THE INVENTION

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented later.

In accordance with an embodiment, a pet bed is provided that is foldable to a compact configuration when not in use. The compact configuration provides easy storage or transportation of the pet bed. When it is desired to use the pet bed, the pet bed is folded to an extended configuration in which a sleeping surface is extended horizontally and a frame spaces the sleeping surface from the floor.

In an embodiment, a frame for the pet bed includes one or more stops to prevent collapsing of the frame when the pet bed is in the extended configuration. The stops release as the pet bed is folded back into the storage configuration.

Other features of the invention will become apparent from the following detailed description when taken in conjunction with the drawings, in which:

DETAILED DESCRIPTION

In the following description, various embodiments of the present invention will be described. For purposes of explanation, specific configurations and details are set forth in order to provide a thorough understanding of the embodiments. However, it will also be apparent to one skilled in the art that the present invention may be practiced without the specific details. Furthermore, well-known features may be omitted or simplified in order not to obscure the embodiment being described.

Figure 1:
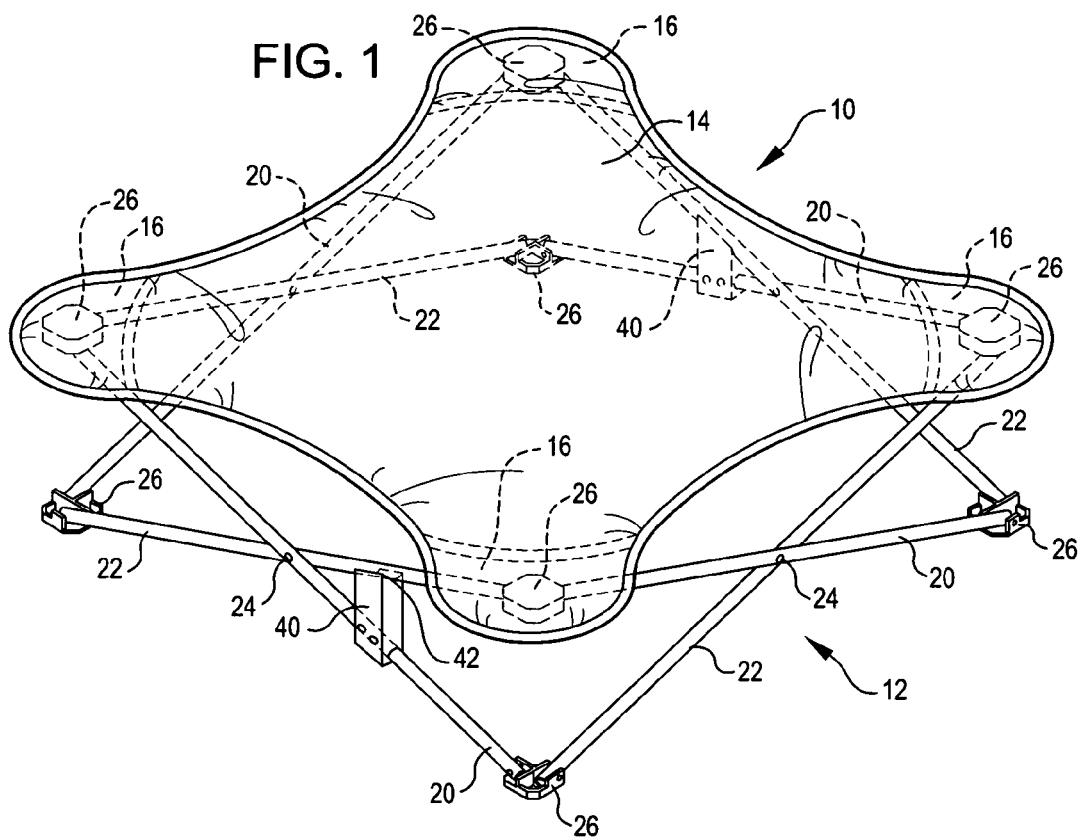
FIG. 1 is side perspective view of a pet bed in accordance with an embodiment of the invention, with the pet bed in an expanded configuration.
Figure 3:
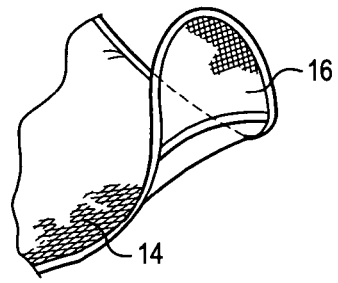
FIG. 3 is a cutaway perspective view showing a corner of a cover for the pet bed of FIG. 1, with the corner extended upward to show a pocket.
Figure 4:
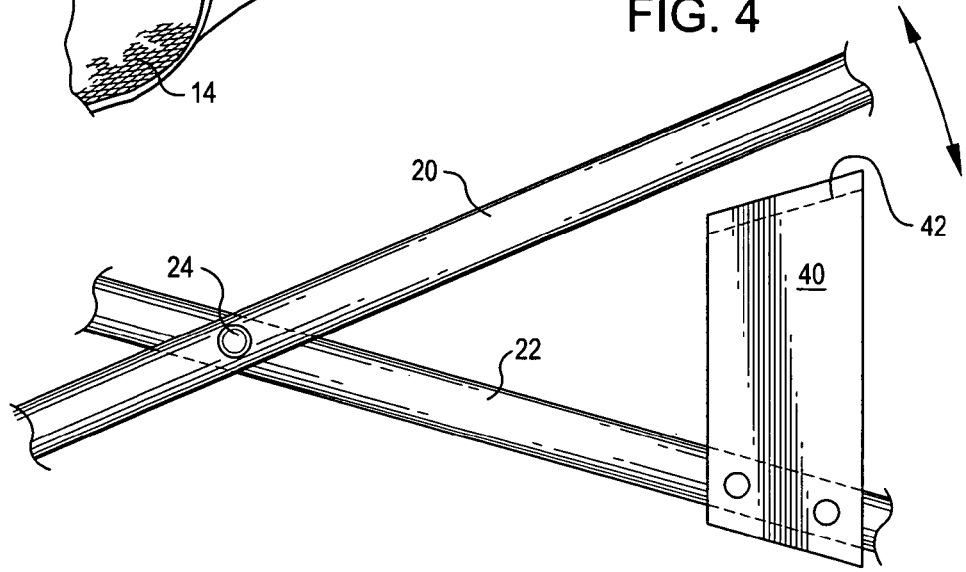
FIG. 4 is a detail view showing a portion of a set of scissor legs for the pet bed of FIG. 1.

Referring now to the drawings, in which like reference numerals represent like parts throughout the several views, FIG. 1 shows a pet bed 10 in accordance with an embodiment of the invention. The pet bed 10 includes a frame 12. A cover 14 is suspended from upper corners of the frame 12. In the embodiment shown, the cover 14 is shaped like a bone or a clover leaf, although other configurations are possible. The cover 14 may be formed, for example, of a fabric, such as canvas, cloth, or any other suitable flexible material. In the embodiment shown, the cover 14 includes pockets 16 (best shown in FIG. 3) formed at the underside of outer corners of the cover 14. Openings for the pockets 16 face toward the center of the cover 14.

The frame 12 includes sets of crossed bars 20, 22, forming a plurality of scissor bar sets about the perimeter of the frame. In the shown embodiment, the number of sets of scissor bars 20, 22 is four forming a square, although another number may be used to provide a different shape for the frame 12. For example, six sets of scissor bars 20, 22 may be connected so as to form an elongate rectangle or a hexagon shape. In any event, the scissor bar sets form a closed loop, and if the bars are straight, a polygon. In accordance with an embodiment, each of the bars 20, 22 for each of the scissor bar sets is of equal length, providing uniform folding of the frame 12.

In the embodiment shown, for each set of scissor bars 20, 22, a center of the bars 20, 22 are rotatably connected to one another by pins 24. The ends of the bars 20, 22 are connected to upper and lower pads 26 such that the upper end of one bar 20 or 22 for one crossing set of bars is attached to the same upper pad 26 as the upper end of a bar for an adjacent set of scissor bars. Likewise, the lower ends of adjacent bars 20 or 22 are attached to the same lower pad 26.

Figure 2:
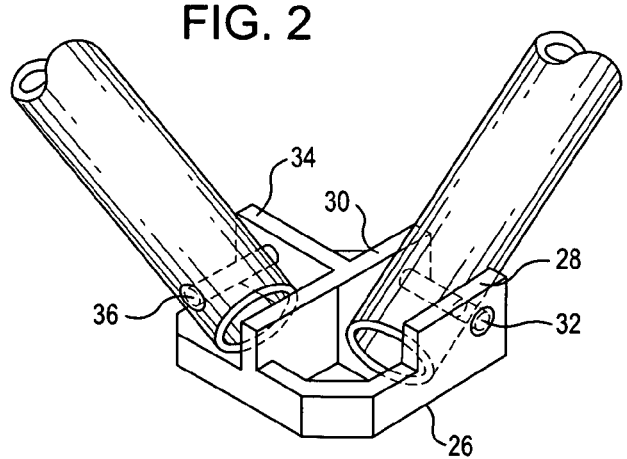
FIG. 2 is a detail view of one of the pads for the pet bed of FIG. 1.

In accordance with an embodiment, the bars 20 or 22 are rotatably attached to the pads 26. For the example shown in the drawings, each pad 26 includes flanges 28, 30 (FIG. 2) for receiving one end of one of the bars 20, 22. A pin 32 extends through the flanges 28, 30, and the end of the respective bar 20 or 22. Another flange 34 is included on the pad 26. This flange 34 is arranged perpendicularly to the flanges 28, 30, and has the opposite bar 20 or 22 (i.e., from the adjacent scissor bar set) attached thereto by a pin 36. Alternate embodiments of a pad 26 may be utilized, and may, as examples, include two sets of double flanges, two sets of single flanges, or other attachment structures for allowing rotatable movement of the ends of the bars 20, 22 relative to the pads. In an embodiment, however, for ease of construction, all eight pads 26 are formed in the same manner making the pet bed 10 relatively inexpensive to produce.

In the embodiment shown, a stop block 40 is mounted on one of the bars 20 or 22 in two of the sets of scissor bars 20, 22. The stop block 40 may be attached by welding, gluing, fasteners, or another suitable method or structure. In the embodiment shown, the stop block 40 is spaced from the pin 24 and includes a groove 42 for receiving the other of the bar 20 or 22 for the scissor bar set. The stop block 40 is arranged and positioned such that it prevents the bars 20, 22 from completely collapsing (i.e., the upper pads 26 aligning against the lower pads) when the frame 12 is folded out to the extended position shown in FIG. 1.

In the embodiment shown, two stop blocks 40 are used. The two stop blocks 40 are located on opposite sides of the frame 12, on opposite sets of scissor bars. If desired, four stop blocks may be provided, one each for each set of scissor bars 20, 22, or three stop blocks may be used, one each for three out of four of the sets. One or more of the sets of scissor bars 20, 22 may include two stop blocks 40, one each on opposite sides of the pin 24. A single stop block 40 may be used for the entire frame 12 (i.e., only on one set of scissor bars), although if only one is used, the single stop block 40 may not adequately support an opposite side of the frame 12 and prevent its collapse.

Although the embodiment shown utilizes stop blocks, other structures may be used to prevent complete collapse of the frame. In general, the stop blocks may be replaced by any structure which prevents full collapse of the frame 12 and allows the frame to be self supporting without use of the cover 14.

As can be understood, by preventing collapse of the frame 12 in the extended position shown in FIG. 1, the upper pads 26 are spaced from a floor or other surface on which the pet bed 10 is placed. Having stop blocks 40 on opposite sides of the frame 12 allows the upper pads 26 to be evenly spaced from the floor.

Figure 5:
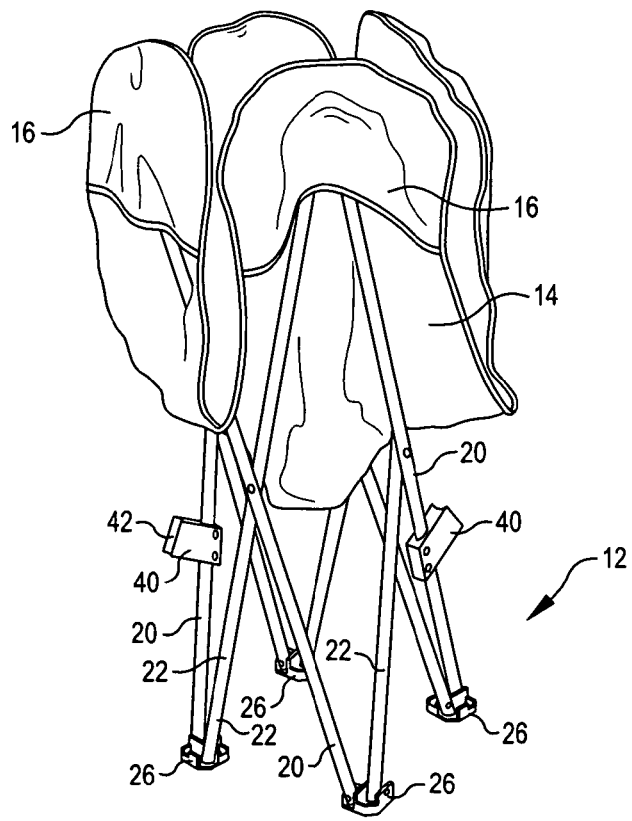
FIG. 5 is a side perspective view the pet bed of FIG. 1, with the pet bed in a compact, storage configuration.

The frame 12 may be folded to a storage configuration as is shown in FIG. 5. To close the frame 12 to the storage configuration, each of the scissor sets of bars 20, 22 are rotated relative to one another, drawing all of the upper pads 26 together, and the lower pads 26 together. When the frame 12 is extended the appropriate extent, the stop blocks 40 are engaged by the respective bar 20 or 22, preventing further rotation of the bars 20, 22 relative to one another.

The pockets 16 on the cover fit over and around the upper pads 26. In an embodiment, the cover 14 is extended horizontally when the frame 12 is in the extended position. Although the cover 14 may be stretched taut, in an embodiment, it hangs somewhat from the upper pads 26 so that the central portion of the cover hangs lower than the outer portions of the cover. This suspended connection of the cover 14 to the frame 12 permits the center of the cover to be concave, providing a "nest" for a pet on the cover 14.

As can be understood, as the frame 12 is folded outward, the upper pads 26 move toward the outer portions of the pockets 16, because the scissor action of the legs 20, 22 forces the upper pads outward and away from one another. However, in an embodiment, the stop blocks 40 prevent the upper pads 26 from being pressed all the way into the pockets 16, so that the cover 14 is free to hang downward from the upper pads. If the frame 12 and stop blocks 40 are configured in this manner relative to the size of the cover 14, the cover is not taut when the frame is fully extended. If the stop blocks 40 were removed, the frame 12 may fully collapse or may be at a much lower position than desired. Even if the cover 14 were configured to be taut, and the stops 40 were not present, the engagement of the upper pads 26 into the pockets 16 at the fully extended position may not be sufficient to stop the movement of the frame 12 from the extended position shown in FIG. 1 toward a fully collapsed position. This engagement of the upper pads 26 with the pockets may not be sufficient in preventing movement of the upper pads 26 downward, and preventing complete collapse of the frame 12, because the extended state of the frame 12 is so close to a fully collapsed configuration that the upper pads 26 do not move outward a significant amount during the last portion of their travel from the extended state to the collapsed configuration. Thus, the stop blocks 40 ensure against complete collapse of the frame 12. In addition, as stated above, it is preferred that the cover 14 not be in this taut state so that a more comfortable pet bed 10 may be provided.

The pet bed 10 of the present invention provides a fully collapsible, easily storable or transportable pet bed 10 that is also comfortable for a pet, such as a dog or a cat. The frame 12 is positioned and arranged such that the cover 14 is not significantly spaced from the ground and is easy for a pet to ascend. In addition, the frame spaces the pet from the ground, and may be used in situations where it is desired to keep the pet off the ground, for example outdoors when the ground is wet.

Other variations are within the spirit of the present invention. Thus, while the invention is susceptible to various modifications and alternative constructions, a certain illustrated embodiment thereof is shown in the drawings and has been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A pet bed, comprising:
a plurality of scissor bar sets, each of the scissor bar sets including two crossed bars pivotally connected where the two bars cross,
wherein upper ends of bars in adjacent scissor bar sets are pivotally connected and lower ends of bars in adjacent scissor bar sets are pivotally connected so that the plurality of scissor bar sets form a closed loop that defines a frame, the frame being foldable from a storage position in which the upper ends of the bars in the plurality of scissor bar sets are positioned adjacent to each other to an extended position in which the upper ends are spread apart and the upper ends are closer to the lower ends of the bars in the plurality of scissor bar sets than when the frame is in the storage position and the angle formed between the upper ends in each of the plurality of scissor bar sets is greater than 90 degrees when the frame is in the extended position;
at least one unitary structure on the frame configured and arranged in a vertical orientation relative to a surface upon which the pet bed may rest to prevent the upper ends from moving to adjacent to the lower ends when the frame is in the extended state; and
a cover suspended from the upper ends.

2. The pet bed of claim 1, wherein the structure comprises a first stop positioned on only one of the bars on a first of the scissor bar sets so that the crossed bars on the first scissor bar set are prevented from moving to a position where the upper ends of the crossed bars of the first scissor bar set are adjacent the lower ends of the first scissor bar set.

3. The pet bed of claim 2, wherein the structure comprises a second stop positioned on one of the bars on a second of the scissor bar sets so that the crossed bars on the second scissor bar set are prevented from moving to a position where the upper ends of the crossed bars of the second scissor bar set are adjacent the lower ends of the second scissor bar set.

4. The pet bed of claim 3, wherein the number of scissor bar sets in the plurality is exactly four.

5. The pet bed of claim 4, wherein the first and second scissor bar sets are on opposite sides of the frame.

6. The pet bed of claim 3, wherein the first and second stops each are spaced from where the respective crossed bars are pivotally connected.

7. The pet bed of claim 6, wherein each of the first and second stops comprises a groove for receiving the other of the bars of the respective first and second scissor bar sets.

8. The pet bed of claim 3, wherein each of the first and second stops comprises a groove for receiving the other of the bars of the respective first and second scissor bar sets.

9. The pet bed of claim 2, wherein the first stop is spaced from where the respective crossed bars are pivotally connected.

10. The pet bed of claim 9, wherein the first stop comprises a groove for receiving the other of the bars of the first scissor bar set.

11. The pet bed of claim 2, wherein the first stop comprises a groove for receiving the other of the bars of the first scissor bar set.

12. The pet bed of claim 1, wherein the upper ends of bars in adjacent scissor bar sets for the plurality of scissor bar sets are pivotally connected at upper pads.

13. The pet bed of claim 12, wherein the cover comprises pockets that extend over and around the upper pads.

14. The pet bed of claim 13, wherein the cover is not taut when suspended from the upper pads when the frame is in the extended position.

15. The pet bed of claim 14, wherein said at least one structure is independent of the connection of the cover to the upper pads.

16. The pet bed of claim 12, wherein the cover is suspended from the upper pads, and wherein said at least one structure is independent of the connection of the cover to the upper pads.

17. The pet bed of claim 12, wherein the lower ends of bars in adjacent scissor bar sets for the plurality of scissor bar sets are pivotally connected at lower pads.

18. The pet bed of claim 12, wherein the upper pads and lower pads are substantially similar.

19. The pet bed of claim 18, wherein the upper pads and lower pads comprise two pairs of flanges, with each pair of flanges having a pin extending between the pair of flanges, and wherein the bars connected to each pad are pivotally connected to the pins.

20. The pet bed of claim 1, wherein the cover is in the shape of a bone.

* * * * *